United States Patent [19]

Wnuk et al.

[11] Patent Number: 4,516,891

[45] Date of Patent: May 14, 1985

[54] SUSPENDED TYPE CELLULAR VOID FILLER

[75] Inventors: Paul A. Wnuk, Stockton, Calif.; Thomas J. Hamilton, Palos Heights, Ill.; Anthony Trassare, Jr., Lodi, Calif.; Michael J. Oliver, Park Forest South, Ill.

[73] Assignee: Down River International, Inc., Sacramento, Calif.

[21] Appl. No.: 393,662

[22] Filed: Jun. 30, 1982

[51] Int. Cl.³ .................. B61D 45/00; B32B 3/12
[52] U.S. Cl. .................. 410/154; 428/116; 52/807; 206/814
[58] Field of Search ...... 410/154, 155; 428/116, 118; 206/583, 814; 52/806, 807

[56] References Cited

U.S. PATENT DOCUMENTS

| 2,674,295 | 4/1954 | Steele et al. | 154/1 |
| 2,848,132 | 8/1958 | Davous | 428/116 X |
| 3,227,599 | 1/1966 | Holland | 161/68 |
| 3,342,666 | 9/1967 | Hull | 161/135 |
| 3,593,671 | 7/1971 | Bramlett | 410/154 |
| 4,007,309 | 2/1977 | Sewell | 428/116 |
| 4,247,237 | 1/1981 | Brown | 410/121 |
| 4,372,717 | 2/1983 | Sewell et al. | 410/154 |

Primary Examiner—Randolph A. Reese
Attorney, Agent, or Firm—Harness, Dickey & Pierce

[57] ABSTRACT

An expansible cellular void filler for dunnage uses is formed of a stack of flat, bendable strips, each except the top and bottom of which is secured at alternating longitudinally spaced positions to an overlying strip and to a subjacent strip, the secured positions being aligned in rows in a direction perpendicular to the planes of the flat strips, the spacing between at least two such rows being less than the spacing between other rows, so that when the strips are moved apart and bend to form cells, the cell sidewalls formed by the portions of the strips which extend between said two rows move toward a straight planar relationship prior to the sidewalls of other cells, and limit the expansion of the filler.

9 Claims, 7 Drawing Figures

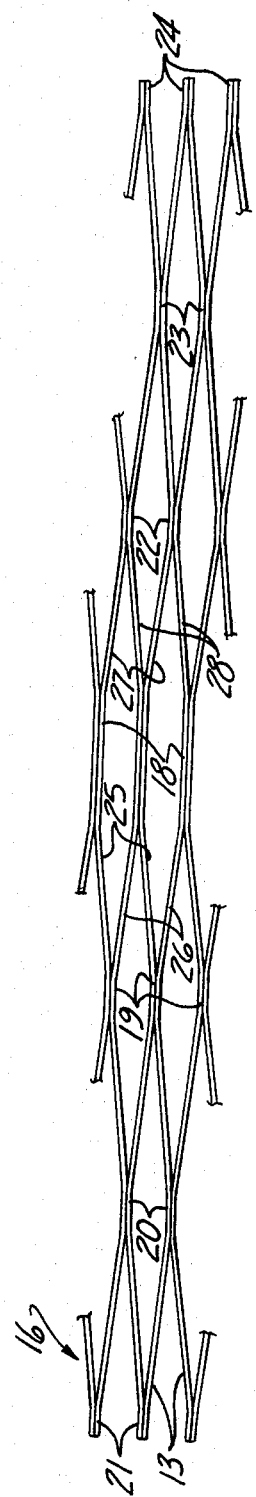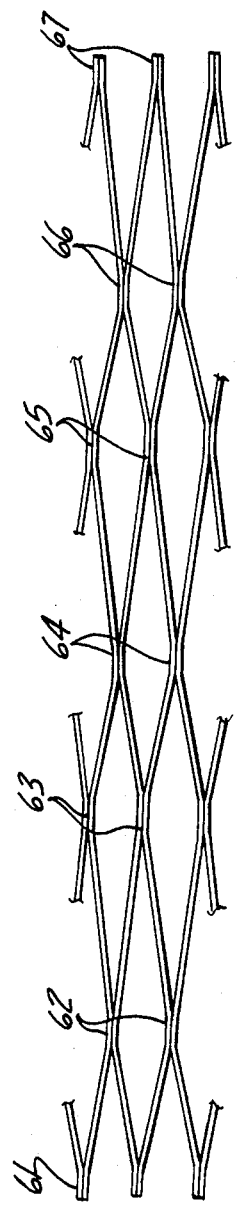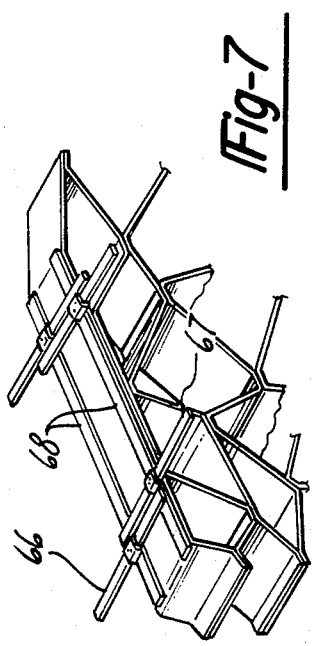

SUSPENDED TYPE CELLULAR VOID FILLER

BACKGROUND OF THE INVENTION

Protective dunnage devices for preventing the unwanted shifting of cargo in trucks, railcars and other cargo carriers are typically required when in use to fill relatively large void areas and to reliably block movement of cargo elements such as stacked and palletized loads which fail to fill and conform to the assigned space in the carrier. Expansible cellular or "honeycomb" void fillers made of strong corrugated paperboard stock have met with great favor in the trade because of their light weight and consequent minimum subtraction from cargo weight limits, their low cost, and their collapsibility, which permits compact and economical storage and shipment of the void fillers themselves.

Such honeycomb void fillers are commonly suspended from above when in use, at which time they are generally held expanded by their own weight. See, for example, Hees U.S. Pat. No. 3,618,535, and Farley U.S. Pat. No. 3,823,675. It is a characteristic of such honeycomb void fillers than when expanded in the normal manner the cells in the mid region of the cellular structure tend to elongate vertically to a greater degree than cells nearer the top and bottom, thereby drawing inwardly the sides of the structure and distorting the filler unit to a narrow waisted or "hourglass" outline. This condition can result in failure of the filler to block the dislodgment of cargo items such, for example, as some of the boxes in a stacked load.

Much effort has been directed to overcoming this problem in the most efficient and economical manner, and with means of minimum weight. See, for example, Bramlett U.S. Pat. No. 3,593,671 and Sewell U.S. Pat. No. 4,007,309. Both of the solutions disclosed in the two patents just mentioned require insertion of special elements in the cell structure to resist the hourglassing tendency. Such special elements add to the cost of the structure and do not contribute proportionately to its effective strength.

The present invention has as its principal object the provision of an improved void filler of the cellular type referred to, incorporating means which effectively reduces hourglass-type distortion, but which requires no special inserted or differentiated structural elements, and wherein the resistance to hourglassing is achieved merely by selectively varying the spacing between certain of the glued areas at which the laminae or strips are secured together, the spacing between the glued securance positions being such as to produce a variation of cell wall dimensions which inherently limits the extension and hourglass distortion of the unit.

Other objects and advantages of the invention will become apparent upon consideration of the present disclosure in its entirety.

BRIEF DESCRIPTION OF THE FIGURES OF DRAWING

FIG. 2 is a fragmentary front elevational view on a larger scale showing a portion of the filler unit partially collapsed;

FIG. 6 is a fragmentary front elevational view of such modified construction analogous to FIG. 2; and FIG. 7 is a fragmentary perspective view of the upper portion of the modified embodiment in the expanded condition and ready for use.

DETAILED DESCRIPTION OF PREFERRED FORM OF THE INVENTION

Figure 1:
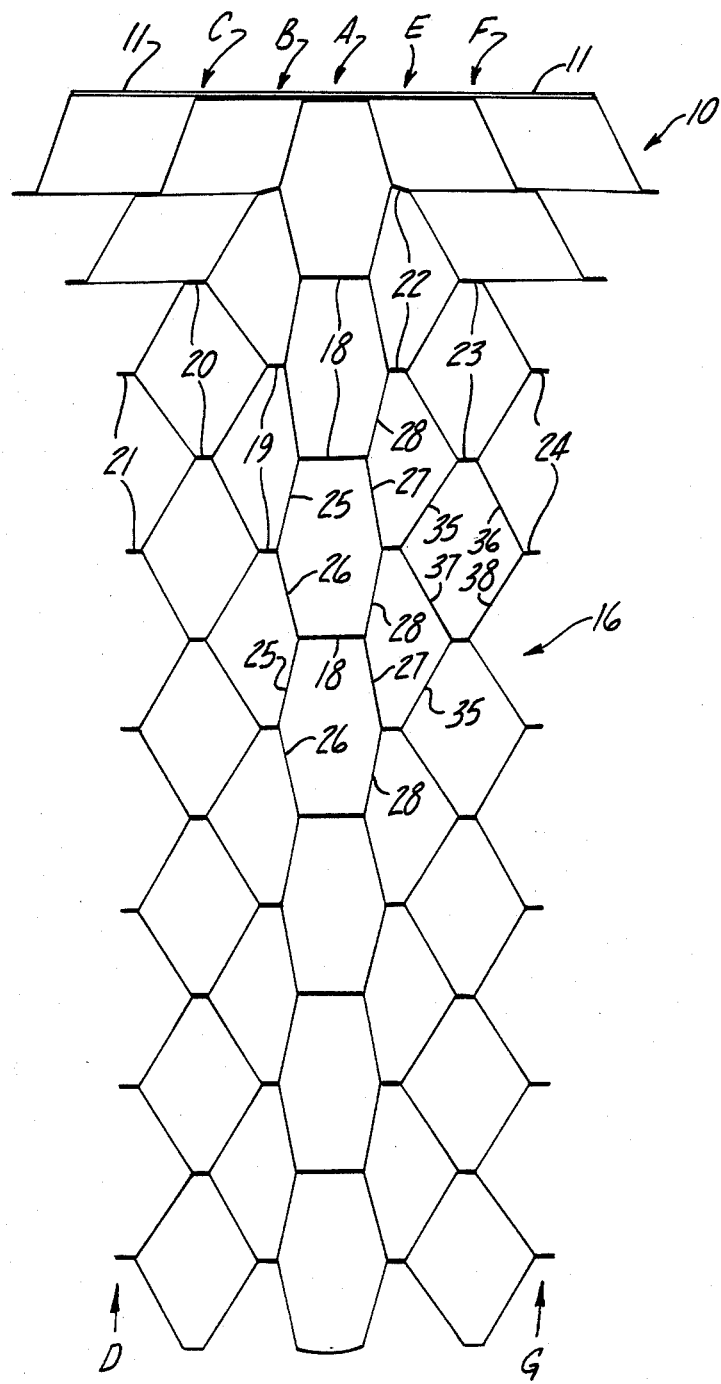
FIG. 1 is a front elevational view of a void filler unit incoporating the principles of the present invention, showing the same in the expanded condition of use.

Reference character 10 designates generally an expansible honeycomb-type structure incorporating the present invention. It is shown in FIG. 1 in the expanded condition it assumes in use in a cargo body or the like when suspended, as by a projecting panel 11 secured to its top, within a void space as 12 (FIG. 3) between or adjacent to stacked cargo elements indicated as boxes 14, 15, to prevent unwanted shifting and dislodgment of the cargo elements.

The cellular or honeycomb body of the filler structure, generally designated 16, is comprised of a plurality of identical aligned rectangular strips 13 of initially flat material such as heavy corrugated paperboard stock. The strips are integrated at alternated spaced positions in a known manner as by gluing each intermediate strip alternately to the strip above it and to the strip below it, the spacing of the glued areas along the individual strips being the same, so that the glued areas are aligned in vertical rows, and so that the stacked strips can at will either be collapsed to a compact flat stacked condition, or expanded in such manner that the strips bend on each side of each of the glued areas and open up to define cells.

Figure 4:
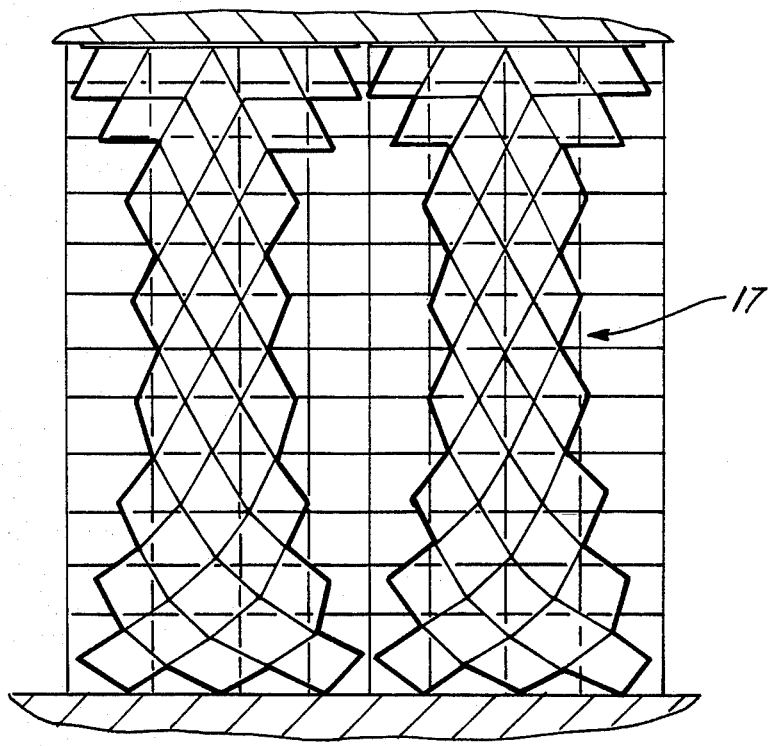
FIG. 4 is a somewhat diagrammatic front elevational view of honeycomb void fillers of a typical prior art type, lacking hourglassing prevention means and expanded for use, illustrating the effect of hourglass-type distortion.

Features thus far specifically referred to in this Detailed Description are known in the art and are also present in prior known types of void fillers including the type illustrated in FIG. 4. When expanded, such materials define cells which although referred to as "honeycomb" and generally of a hexagonal or diamond shape, actually may be of various shapes depending upon the width and spacing of the glued positions.

It has been the general practice in prior art honeycomb filler constructions to provide uniform spacing between the glued areas. In other words, although the glued areas may be of different widths, it has been the practice to make the actual spacings between them uniform, and the cell walls defined by the unglued portions are therefore all of equal length, regardless of any variations in the size of the (horizontal) cell walls defined by the glued areas. If during the expansion of the unit such uniform cell walls, defined by the unglued portions, all moved to corresponding angular positions, the expanded unit would assume and maintain a rectangular shape in its pulled-down expanded condition of use. However, this does not in practice occur. Due to the weight of components of the structure itself and the consequent differences in gravitational loading throughout the structure, the cells in the mid-region of such prior art structures having uniform walls defined by the unglued portions, tend to elongate vertically more than the cells nearer the top and the bottom of the structure. The sides of the entire expanded filler structure are thereby drawn inwardly toward each other so that the structure assumes a narrow waisted or hourglass configuration, as shown somewhat diagrammatically in FIG. 4, at 17.

In accordance with the present invention, certain of the unglued cell walls, preferably in one or more vertical rows which extend the full height of the structure, are shortened. Such shortening is effected by reducing the spacing between certain of the glued areas. Referring to FIGS. 1 and 2, the distance between all of the glued areas 18, which lie in a vertical row designated A, and the glued areas 19 of the row B shown to the left thereof is less than the distance between the glued areas 19–20 in rows B and C, and the glued areas 20–21 of rows C and D farther to the left. Similarly, the distance between the glued areas 18 of the central vertical row A and the glued areas 22 in row E shown to the right thereof is less than the distance between the glued areas 22–23, rows E and F, and that between the glued areas 23–24, rows F and G, farther to the right. All of the shortened distances between the glued areas 18–19 and between the glued areas 18–22 are the same, and all of the longer distances between the glued areas 19–20, 20–21, 22–23 and 23–24 are the same.

Figure 3:
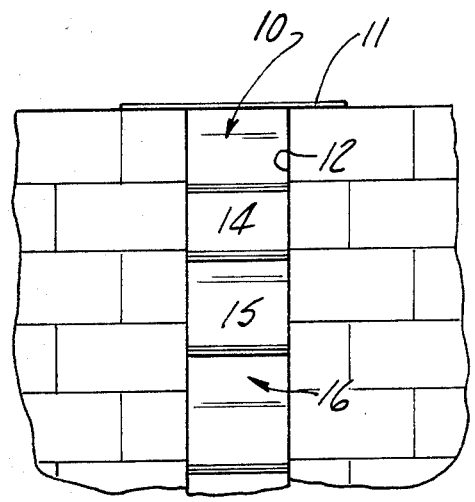
FIG. 3 is a fragmentary end elevational view of the upper portion of the void filler unit showing a typical manner of suspension thereof between stacked boxed cargo.

As the unit is pulled down from its top supporting panel 11, which in use may overlie stacks of cargo elements, as shown in FIG. 3, the cell walls 25, 26, 27, 28 defined by the unglued portions on each side of the central glued areas 18 assume positions more nearly vertical, that is, more nearly in a straight vertical line than the longer cell walls defined by the unglued portions which extend between and interconnect the glued regions 19–20, 20–21, 22–23 and 23–24. Thus the walls 25, 26, and also the walls 27, 28 straighten toward a vertical linear relationship and define expansion-limiting walls while the walls of the other cells, exemplified by walls 35, 36, 37, 38, remain at a greater angle to the vertical. In the preferred construction shown in FIGS. 1 and 2, this causes the cells bounded by the central glued areas 18 and the walls 25, 26, 27, 28 to approach a rectangular form (row A), while the other cells, such as those bounded by the walls 35–38, remain more nearly diamond shaped, or triangular shaped, in the case of the cells of rows B and E.

It will be noted that in the construction of FIGS. 1 and 2 the stretch-limiting walls defined by cell walls 25, 26, 27, 28 are created by shortening the walls 25, 26, 27, 28 in proportion to other cell walls, and that such shortening is effected by providing, in the central vertical row or line A, glued areas 18 which are substantially wider than the other glued areas of the structure, such greater width of the glued areas 18 having the effect of shortening the side walls 25, 26, 27, 28 of the central vertical row of cells.

Figure 5:
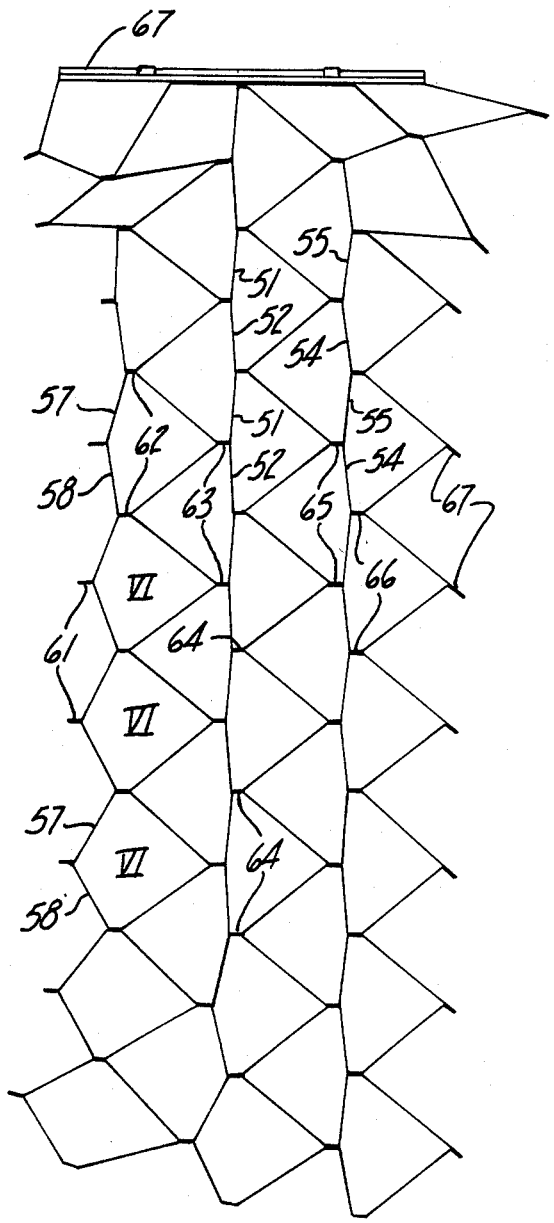
FIG. 5 is a front elevational view similar to FIG. 1 illustrating a modified form of the invention.

It will be recognized, however, that shortened stretch-limiting walls can with equal facility be formed by varying the spacing of the glued areas, rather than by providing glued areas of different widths. A preferred example of such a structure wherein shortened, stretch-limiting walls are provided by varying the spacing between glued areas of uniform width, rather than by providing glued areas of different widths, is shown in FIGS. 5–7. As there shown, two stretch-limiting lines of cell walls are provided near the center of the structure (considered transversely) such shortened walls being designated 51, 52, and 54, 55. When the unit is expanded, cell walls 51 and 52 straighten to substantially rectilinear relationship at the left side of a double row of vertical medial cells VIII and IX, and cell walls 54, 55 form a similar shortened stretch-limiting and more nearly vertical wall at the right side of the double central row of cells VIII and IX. In this structure shorter and longer walls are alternated throughout the unit. This aspect will be referred to further hereinafter.

Although the unit illustrated in FIGS. 5 and 6 is only five cells wide, it will be appreciated that it may be made of any desired width incorporating any desired number of cells, and that likewise the first described embodiment can be widened to incorporate any desired number of both regular and stretch-limiting cells, as may be desired.

Referring to the cells in FIGS. 5 and 6, from the left to right, it will be seen that the cells VI are glued at 61 at their left ends, while at the top and bottom the cells VI of this vertical row have glued areas positioned as shown at 62. The next glued area to the right is designated 63 and the succeeding glued areas are designated 64, 65, 66 and 67. The distance between the glued areas 61 and 62 is the same as the distance between the glued areas 63 and 64 and the same as the distance between the glued areas 65 and 66 (e.g.: 7 inches). The distance between the glued areas 62 and 63 is somewhat longer than the distances just referred to (e.g.: 11 inches) and is the same as the distance between the glued areas 64–65 and 66–67. As a result, it will be seen that the left-hand walls 57, 58 are also shortened and are of the same length as the walls 51, 52, 54 and 55. However, as shown in FIG. 5, when the unit is hung, in the extended condition, and maintains its expanded condition under gravity, less of the structural mass exerts a stretching force on the walls 57, 58 at the left margin. Thus, as shown in FIG. 5, these walls do not straighten to the same extent as the more centrally positioned walls 51, 52 and the walls 54, 55. Nevertheless, if the unit is made wider, the shortened walls are alternately positioned and all tend to assume a more rectilinear vertical condition, and limit the extension of the units, particularly in the mid regions, and to reduce the hourglassing tendency in the same manner as the shortened walls 25, 26, 27, 28 of the first-described embodiment.

The manner of supporting or suspending the filler unit is of course subject to variation and does not form a part of the present invention. As shown in FIGS. 1–3 a stiff panel 11 of paperboard secured to and projecting from the top of the filler may be used, as is common in the art, or, as best shown in FIGS. 5 and 7, wooden arms as 66, 67 pivotally attached to reinforcing strips 68 secured to the top of the unit may be employed, as taught in U.S. Pat. Nos. 3,618,535 and 3,854,426. Arms 66, 67 are swingable from indrawn aligned positions on top of the stack during storage and shipment of the collapsed units, to outswung projecting positions wherein they may overlie the protected cargo and support the suspended, expanded filler. These and other features may be varied without departing from the fair and proper scope of the invention as taught by the present disclosure and as set forth in the appended claims.

This Detailed Description of preferred forms of the Invention, and the accompanying drawings, have been furnished in compliance with the statutory requirements to set forth the best mode contemplated by the inventor of carrying out the invention. The prior portions consisting of the Abstract of the Disclosure and the Background of the Invention are furnished without prejudice to comply with administrative requirements of the Patent and Trademark Office.

I claim:

1. An expansible cellular-type void filler structure having:

an upper supporting portion from which it is adapted to depend in an expanded condition, a plurality of elongated superposed aligned strips of initially flat material, each such strip secured at a plurality of longitudinally spaced areas to an overlying strip and also being secured to a subjacent strip at a plurality of longitudinally spaced areas intermediate said first-mentioned areas, the strips being hingedly bendable on each side of each such secured area around generally parallel lines transverse to the length of the strip, the longitudinal spacings of the secured areas of all of the strips being such that the secured areas are in vertical rows, whereby the strips can be collapsed to flat stacked relationship or expanded to form a plurality of vertical rows of open cells, the cells which comprise each vertical row of open cells having, on each side, walls which provide a continuous vertically disposed uninterrupted series of directly connected walls which interconnect all of the secured areas which define one of said vertical rows of secured areas, characterized in that the length of at least one of said series of directly connected walls is shorter than the length of other series of directly connected walls, thereby defining a shortened series of cell walls lying in a vertical row to limit the expansion of the cellular structure.

2. A void filler structure as defined in claim 1 wherein one of said vertical rows of cells is located approximately centrally of the length of the strips, each series of side walls of said one row of cells being one of said shorter series.

3. A void filler structure as defined in claim 1 wherein the secured areas which define at least one vertical row of secured areas are wider in a direction longitudinal with respect to the strips than the secured areas in other rows, to reduce the spacing between such wider secured areas and the secured areas on either side of the wider secured areas.

4. A structure as defined in claim 3 wherein the row of wider secured areas is located generally medially of the length of the strips.

5. A void filler structure as defined in claim 1 wherein all of the secured areas are of the same width.

6. A void filler structure as defined in claim 1 wherein the spacings between the secured areas alternate in length throughout the length of the strips.

7. A void filler as defined in claim 1 wherein all of the secured areas of the same width and the spacings between them alternate in length throughout the length of the strips.

8. An expansible cellular-type void filler structure of the type comprising initially generally flat stacked strip elements integrated at alternated positions in such manner that when moved apart to expand the structure the strip portions which extend between such positions move to angular relationships relative to their initially flat orientation, to thereby define cell walls, said cell walls being aligned in rows which are longitudinal with respect to the direction of expansion and also in rows transverse to such direction, characterized in that certain of said cell walls are shorter than others which lie in the same transverse row and thereby limit the expansion of the structure.

9. An expansible cellular void filler having a plurality of rows of directly hingedly connected cell walls which extend in the direction of expansibility of the void filler as the void filler is expanded, one or more of said rows being shorter than the others.

* * * * *

UNITED STATES PATENT AND TRADEMARK OFFICE
CERTIFICATE OF CORRECTION

PATENT NO. : 4,516,891
DATED : May 14, 1985
INVENTOR(S) : Paul A. Wnuk et al

It is certified that error appears in the above-identified patent and that said Letters Patent is hereby corrected as shown below:

Column 1, line 24, "than" should be --that--.

Column 1, line 62, "incoporating" should be --incorporating--.

Column 5, lines 6 and 7, Claim 1, delete paragraph:

"an upper supporting portion from which it is adapted to depend in an expanded condition,".

Column 5, line 10, Claim 1, following "strip" insert --being--.

Signed and Sealed this

Twenty-seventh Day of August 1985

[SEAL]

Attest:

DONALD J. QUIGG

Attesting Officer

Acting Commissioner of Patents and Trademarks